T. F. McCALLISTER.
MOTOR TRACTOR.
APPLICATION FILED MAR. 6, 1918.
1,339,271.
Patented May 4, 1920.
2 SHEETS—SHEET 1.
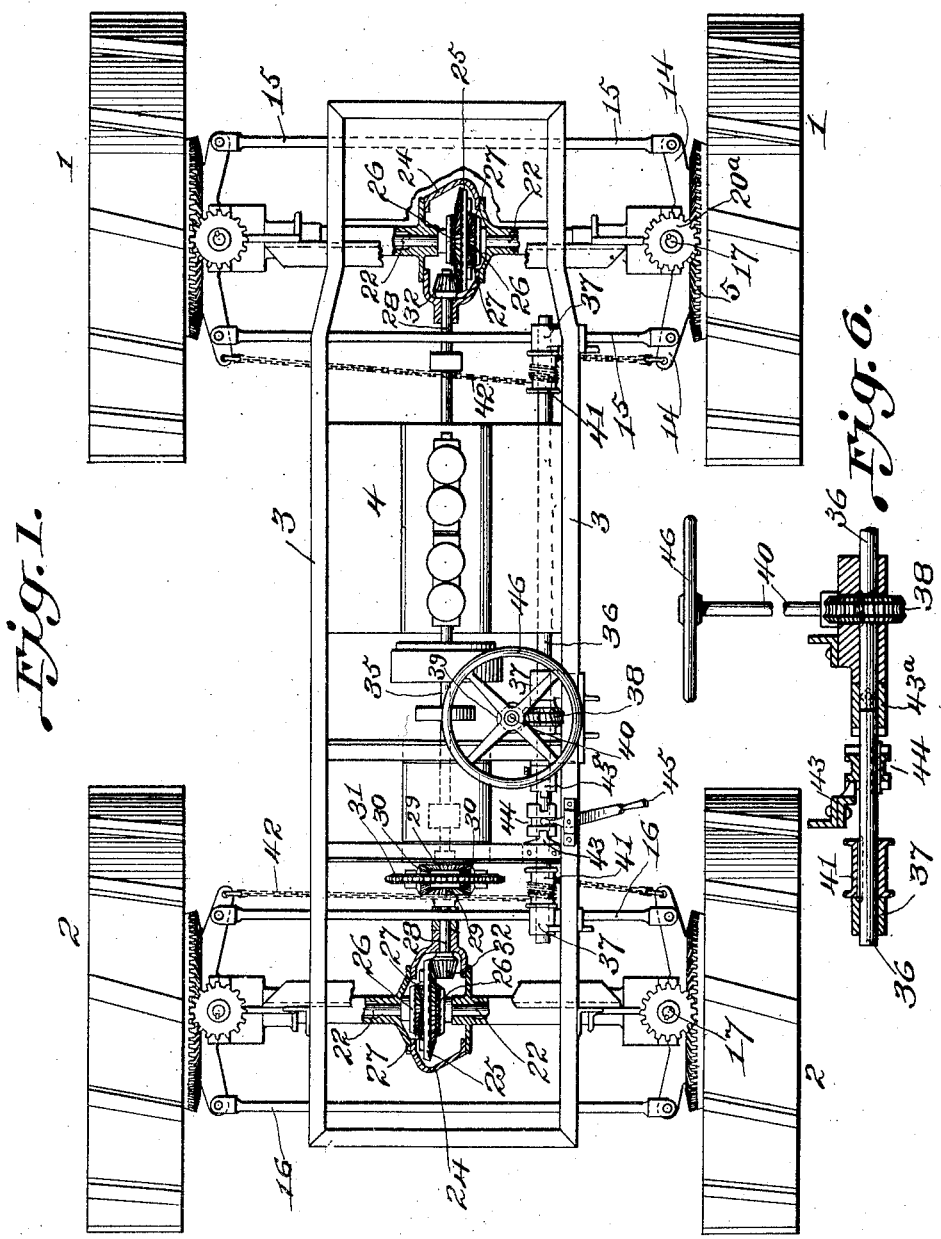

T. F. McCALLISTER.
MOTOR TRACTOR.
APPLICATION FILED MAR. 6, 1918.
1,339,271.
Patented May 4, 1920.
2 SHEETS—SHEET 2.
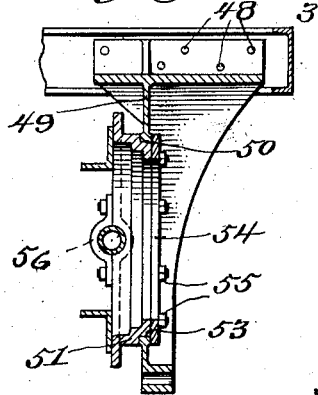
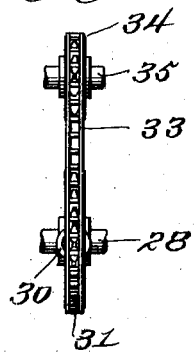
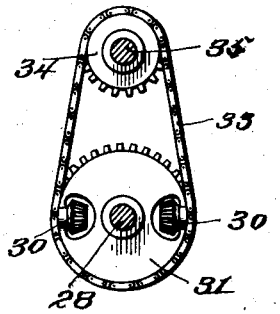
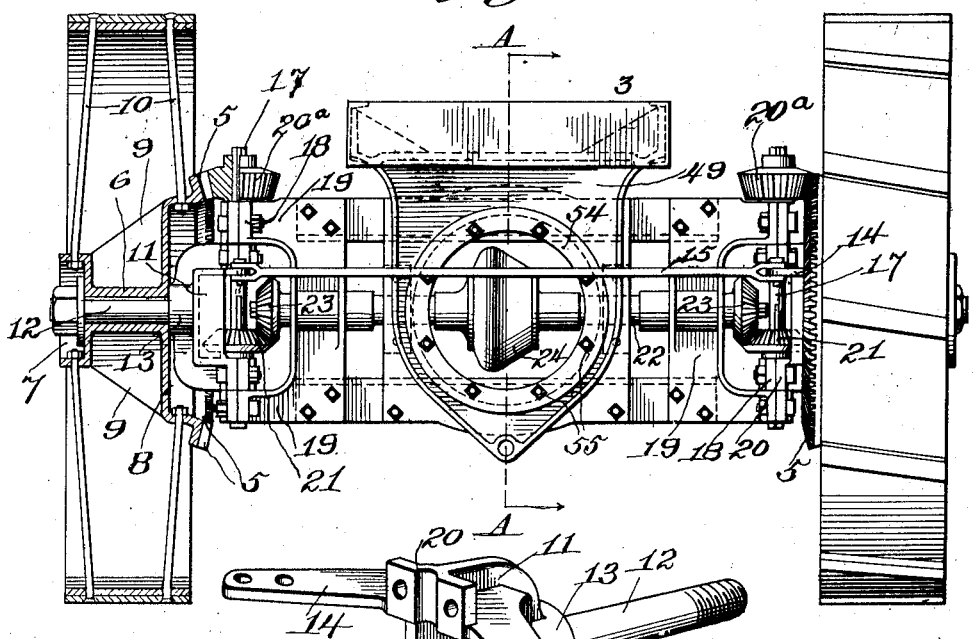

UNITED STATES PATENT OFFICE.

THOMAS F. McCALLISTER, OF PRINEVILLE, OREGON.

MOTOR-TRACTOR.

1,339,271.      Specification of Letters Patent.      Patented May 4, 1920.

Application filed March 6, 1918. Serial No. 220,787.

*To all whom it may concern:*

Be it known that I, THOMAS F. McCALLISTER, a citizen of the United States, residing at Prineville, in the county of Crook and State of Oregon, have invented certain new and useful Improvements in Motor-Tractors, of which the following is a specification.

This invention relates to gearing for motor tractors, and pertains especially to improvements in and application of the gearing patented by me September 11, 1917, No. 1,240,069.

The object of this invention is to modify and multiply the differential gears of my said patent in connection with the four traction wheels of a motor vehicle so as to utilize each and all of said wheels for driving purposes, whereby a motor tractor of great power and speed is produced.

A further object of the invention is to provide brake mechanism and steering mechanism in connection with and operated by certain shafts and differential gears such as contained in my said patent.

A still further object of the invention is to furnish a motor tractor having a differential gear drive in both the rear and front axle shafts and a differential gear between said differential gears in a longitudinal shaft operated by a motor shaft, and to provide a chain and lever mechanism for operating the front and rear wheels in a steering operation.

A still further object of the invention is to provide, in a motor tractor, a peculiar gear and pinion arrangement for each of the four traction wheels, a shaft having a central differential gear and end pinions for each pair of said wheel gears, levers connecting the wheel hubs in pairs so that each pair of wheels may be moved in unison in a steering operation, and to furnish manually controlled means for operating said levers so as to couple and uncouple the front and rear wheel levers, according to requirements for operating the front and the rear wheels or the front wheels alone in steering operations.

A still further object of the invention is to provide novel and peculiar means for mounting the bolsters so that the traction wheels may be free for vertical movement without imparting such movement to the frame and body of the machine.

Various other objects, advantages and improved results will be found in the practical application and utilization of the invention hereinafter fully described.

In the accompanying drawings forming part of this application:

Figure 1 is a top plan view, partly broken away, of a motor tractor embodying the invention partly in section.

Fig. 2 is a detail elevation of the chain and sprockets connecting the motor shaft with the differential shaft.

Fig. 3 is an end view, showing one of the traction wheels and part of its gear in section.

Fig. 4 is a detail section of the frame taken on the dotted line A—A, Fig. 3.

Fig. 5 is a detail sectional end elevation of the longitudinal shaft gear and the chain and sprocket gear connecting this shaft with the motor shaft.

Fig. 6 is a detail elevation of the steering shaft, partly broken away, showing the chain drums and clutch.

Fig. 7 is a detail perspective of one of the spindle heads.

The same reference characters denote the same parts throughout the several views of the drawings.

In carrying out my invention I employ four traction wheels each of which constitutes a driving wheel, as the front wheels 1 and the rear wheels 2, and a longitudinal frame 3, and a motor or engine 4 mounted as usual on said frame. All the traction wheels being of the same construction, only one of them will be described in detail. The inner peripheral face of the wheel hub is provided with a beveled gear 5 offset laterally and angularly from the spindle bearing 6, which has an outer socket 7 braced with the outer wall 8 of the gear 5 by hub webs 9. One set of wheel spokes 10 is attached to the hub gear member and the other set of spokes is attached to the socket member 7. This construction not only forms a large gear and a concavity in which the head 11 of the axle spindle 12 works, but constitutes an unusually strong hub, and affords means for attaching the spokes, one set to the inner member of the hub and the other set to the outer member of the hub.

The spindle head 11 has a bushing 13, forming, with the spindle, a shoulder, and the head has a countersunk or cup-shaped inner face and a pair of arms 14 branched therefrom. The spindle heads are each provided with a pair of said arms, and the arms of the front pairs are connected by fulcrum rods 15, and like rods 16 connect the arms of the rear pairs, whereby the traction wheels are connected and may be turned in unison in a steering operation, as will be hereinafter more particularly referred to.

A vertical shaft 17 is provided for each of the traction wheels, and extends centrally across the inner face of the spindle heads 11. The shafts 17 are journaled in bearings 18 of the bolster yoke 19, and in like bearings 20 of the spindle heads 11. The bearings 20 are loose within the yoke ends and have free movement with respect to the yoke bearings 18, so as to permit swinging movement of the spindle heads. A pinion 20ª is secured to the upper end of the shafts 17 and meshes with the hub gear 5. A pinion 21 is secured to the lower portion of the shafts 17 and is partly housed by the countersunk portion of the spindle heads 11. A driving shaft 22 is journaled in the yokes 19 between each pair of the vertical shafts 17, and each end of the shafts 22 is provided with a pinion 23 meshing with the pinions 21. The shafts 22 are provided centrally with a differential gearing inclosed by a suitable casing 24 and comprising a central large bevel gear 25, a beveled gear 26 and a pair of pinions 27 between the gears 25 and 26 for revolving the shafts 22, which, in coöperation with the wheel hub gearing, produces a driving mechanism in each of the four traction wheels, and thereby increases or multiplies the driving properties of this machine.

The front and rear differential gears are operated by a longitudinal shaft 28 having gears comprising a pair of beveled gear wheels 29 opposite each other, and a pair of pinions 30 meshing with the gears 29 and operating a sprocket gear 31. Each end of the shaft 28 has a pinion 32 meshing with the main differential gear wheel 25 for operating the differential gears of the front and rear shafts 22. The only difference in the arrangement of the differentials of the shafts 22 is that the front main wheel 25 is placed in reversed position to that of the rear wheel, so that the pinions 32 mesh with teeth of these wheels in reversed position, and the shaft 28 with its pinions imparts the same or equal driving power to the front and rear shafts 22. The periphery of the main wheel or gear 31 is provided with sprocket teeth for a sprocket chain 33 operated by a sprocket wheel 34 on the rearwardly projecting end of the motor driven shaft 35 for operating the differential gear of the shaft 28. In the steering mechanism I provide means for operating the pair of front wheels alone and also for operating the pair of rear wheels jointly with the front wheels. Said mechanism and means comprising a longitudinal two-part shaft 36, journaled at 37 on the side of the frame 3, and having a worm gear 38 operated by a worm 39 on the steering wheel shaft 40. Each end of the shaft 36 is provided with a drum 41 secured to and revolved by said shaft, and the drums operate chains 42 having their ends attached to the ends of the arms 14 for turning the traction wheels in front and rear pairs, as desired. The shaft 36 is provided with a pair of clutch members 43, 43ª, and a slidable clutch member 44, which connects the shaft ends when the member 44 is operated by a hand lever 45 for having the shaft 36 operate either one or the other of the drums. When the clutch member 44 is in engagement with the member 43, as shown in Fig. 1 of the drawings, and the hand wheel 46 is operated, only the front wheels are operated for steering, and when the member 44 is slid into engagement with the other member 43ª, the rear wheels are operated for steering. Obviously, this steering mechanism permits the machine to be expeditiously operated in making short turns, and makes both the rear and front wheels available for steering, and for such conditions as may require lateral movement of the front and rear wheels.

One of the essential features of this machine is to afford means for permitting the traction wheels to adjust themselves vertically to various conditions of road or ground surfaces or conditions such as gullies, ditches and the like, without twisting or changing the position of the frame or motor and the various driving shafts and gearing hereinbefore described. This is accomplished by providing the bolsters, which are bolted at 48, to the frame 3, with a depending web 49 forming a bearing 50 for a pivot ring 51 mounted on the wheel axles or shafts by means of a clamp 56. The ring 51 has an annular shoulder forming a web bearing 53, and the ring is loosely held for pivot movement in the web by a ring flange 54 bolted to the ring 51, as at 55. The ring 51 is loosely mounted on the traction wheel axles or shafts 22 by means of a clamp 56, so as to permit the axles to revolve therein, and to form a central pivot in the axles for permitting the traction wheels such vertical movement as the surface or conditions in travel of the machine may require, so that the frame and body of the machine will not be affected by such conditions or by the vertical movement of the wheels.

It will be seen that I have provided a machine the traction wheels of which are capable of lateral swinging movement, and of vertical movement. Both of said movements being independent of the main frame and body of the machine, so that the position of the frame and body, including the engine or motor, remains the same under all and various positions of the traction wheels.

It will be observed that I have devised gearing mechanism between each wheel and the axles of such power as to greatly increase the utility of such machines for heavy draft, and have devised means permitting the machine to be operated over various surfaces, and in drawing agricultural implements over fields of various conditions.

Obviously, various mechanical changes and variations may be resorted to in manufacturing the various parts and devices and in assembling the same for practical working as desired or as occasion may demand; therefore, I do not wish to confine the invention to any particular size, weight or material, nor to the exact location of and means for connecting the parts.

Having thus described my invention, what I claim as new and desire to secure by Letters Patent is:

In a tractor, a driven axle, a frame having a cross member, a web secured to said member and depending below the axle, a ring having circular movement in the web, and journal bearings on the face of the ring for said axle, whereby the axle may have pivot movement during its revolution.

In witness whereof I hereunto set my hand in the presence of two witnesses.

THOMAS F. McCALLISTER.

Witnesses:
M. E. BRINK,
T. M. BALDWIN.